(12) United States Patent
Phillips et al.

(10) Patent No.: US 11,897,015 B2
(45) Date of Patent: Feb. 13, 2024

(54) ENTWINED TUBULAR ARRANGEMENTS FOR HEAT EXCHANGERS AND COUNTERFLOW HEAT TRANSFER SYSTEMS

(71) Applicant: HS Marston Aerospace Limited, Wolverhampton (GB)

(72) Inventors: Paul Phillips, Bromsgrove (GB); Berwyn Pollard, Wolverhampton (GB)

(73) Assignee: HS MARSTON AEROSPACE LIMITED, Wolverhampton (GB)

( * ) Notice: Subject to any disclaimer, the term of this patent is extended or adjusted under 35 U.S.C. 154(b) by 64 days.

(21) Appl. No.: 17/459,078

(22) Filed: Aug. 27, 2021

(65) Prior Publication Data
US 2021/0387244 A1 Dec. 16, 2021

Related U.S. Application Data

(62) Division of application No. 15/988,460, filed on May 24, 2018, now Pat. No. 11,110,502.

(30) Foreign Application Priority Data

May 25, 2017 (EP) ..................................... 17172935

(51) Int. Cl.
*B21D 11/06* (2006.01)
*B21D 53/06* (2006.01)
(Continued)

(52) U.S. Cl.
CPC .............. *B21D 11/06* (2013.01); *B21D 53/06* (2013.01); *B23P 15/26* (2013.01); *F28D 7/0016* (2013.01);
(Continued)

(58) Field of Classification Search
CPC ......... B21D 11/06; B21D 53/06; B23P 15/26; F28D 7/0016; F28D 7/026; F28D 7/0008; F28F 13/08; F28F 2009/0292
See application file for complete search history.

(56) References Cited

U.S. PATENT DOCUMENTS 2,650,801 A 9/1953 Colto
3,199,583 A 8/1965 Hood et al.
(Continued)

FOREIGN PATENT DOCUMENTS

DE 2541399 A1 3/1977
DE 3122944 A1 1/1983
(Continued)

OTHER PUBLICATIONS

Extended European Search Report for International Application No. 17172935.3 dated Feb. 15, 2018, 11 pages.

*Primary Examiner* — Rick K Chang
(74) *Attorney, Agent, or Firm* — CANTOR COLBURN LLP

(57) ABSTRACT

A counterflow heat transfer system comprises a heat exchanger and a flow controller arranged to convey a first fluid through the heat exchanger in a first flow direction and a second fluid through the heat exchanger in a second counterflow direction. The heat exchanger comprises at least one first thermally conductive tube conveying the first fluid and at least one second thermally conductive tube conveying the second fluid. The first and second tubes are wound around one another and in contact with one another in an entwined tubular arrangement.

10 Claims, 3 Drawing Sheets

(51) Int. Cl.
- *F28D 7/00* (2006.01)
- *B23P 15/26* (2006.01)
- *F28D 7/02* (2006.01)
- *F28F 13/08* (2006.01)
- *F28F 9/02* (2006.01)

(52) U.S. Cl.
CPC ............ *F28D 7/026* (2013.01); *F28D 7/0008* (2013.01); *F28F 13/08* (2013.01); *F28F 2009/0292* (2013.01)

(56) References Cited

U.S. PATENT DOCUMENTS

| | | |
|---|---|---|
| 4,287,724 A | 9/1981 | Clark |
| 4,434,539 A | 3/1984 | Sanborn et al. |
| 4,785,878 A | 11/1988 | Honkajärvi et al. |
| 4,893,672 A | 1/1990 | Bader |
| 6,167,715 B1 | 1/2001 | Hebert |
| 7,165,605 B2 | 1/2007 | Park et al. |
| 9,541,331 B2 | 1/2017 | Nagurny et al. |
| 9,605,912 B2 | 3/2017 | Neal et al. |
| 2012/0312514 A1 | 12/2012 | Erickson |
| 2013/0283835 A1 | 10/2013 | Katoh et al. |
| 2016/0146541 A1 | 5/2016 | De Nardis |
| 2016/0281532 A1* | 9/2016 | Rambo ................. F02C 7/18 |
| 2018/0339329 A1 | 11/2018 | Phillips et al. |

FOREIGN PATENT DOCUMENTS

| | | |
|---|---|---|
| EP | 0344351 A1 | 12/1989 |
| EP | 3124906 A1 | 2/2017 |
| EP | 3228971 A1 | 10/2017 |

\* cited by examiner

ENTWINED TUBULAR ARRANGEMENTS FOR HEAT EXCHANGERS AND COUNTERFLOW HEAT TRANSFER SYSTEMS

CROSS REFERENCE TO RELATED APPLICATIONS

This application is a division of U.S. application Ser. No. 15/988,460 filed May 24, 2018, which claims the benefit of European Patent Application No. 17172935.3 filed May 25, 2017, the disclosures of which are incorporated herein by reference in their entirety

TECHNICAL FIELD

The present disclosure relates to counterflow heat transfer systems, heat exchangers and entwined tubular arrangements for heat exchangers, and additive manufacturing methods for the same.

BACKGROUND

Heat exchangers for high temperature/pressure applications are often made as counter current shell-and-tube heat exchangers from materials such as Inconel or steel. These shell-and-tube heat exchangers contain a multitude of hollow tubes that have a hot fluid passing through them, this hot fluid being cooled by cross-flowing a colder fluid (such as air) over the tubes in an outer shell. Shell-and-tube heat exchangers are often larger than their compact cross-flow plate and fin counterparts, which are not suitable for similar applications which shell-and-tube heat exchangers are used for.

There remains a need for improved counterflow heat transfer systems and tubular heat exchanger architectures.

SUMMARY

According to an aspect of the present disclosure there is provided a counterflow heat transfer system comprising a heat exchanger and a flow controller arranged to convey a first fluid through the heat exchanger in a first flow direction and a second fluid through the heat exchanger in a second counterflow direction, the heat exchanger comprising: at least one first thermally conductive tube conveying the first fluid; and at least one second thermally conductive tube conveying the second fluid; wherein the first and second tubes are wound around one another and in contact with one another in an entwined tubular arrangement.

A heat transfer system according to the present disclosure therefore takes the counterflow of a traditional shell-and-tube heat exchanger but removes the need for an outer shell surrounding the entwined tubular arrangements of tubes. Instead, the increased contact area between the first and second tubes allows for heat transfer between the counterflowing first and second fluids. This results in a high heat transfer efficiency tubular-style heat exchanger operating as a counter-current heat transfer system. The brazed baffle plates typically used to hold tube bundles together in a shell-and-tube heat exchanger may no longer be needed. The system can be more compact than conventional shell-and-tube heat exchangers. The system may have a reduced volume as compared to conventional shell-and-tube heat exchangers.

In at least some examples, the flow controller is arranged to convey a first fluid through the heat exchanger that is hotter than the second fluid, the heat exchanger comprising a plurality of second thermally conductive tubes conveying the second (i.e. cooler) fluid. In such examples, the heat exchanger may comprise one first thermally conductive tube conveying the first (i.e. hotter) fluid and at least two second thermally conductive tubes conveying the second (i.e. cooler) fluid. In some examples, there may be two, three, four or more second thermally conductive tubes conveying the second (i.e. cooler) fluid for each first thermally conductive tube conveying the first (i.e. hotter) fluid in the entwined tubular arrangement. It will be appreciated that the number of tubes conveying a given fluid at any point of time is a feature of the system that can be determined during use. At different times, there may be a different number of first tubes conveying the first (i.e. hotter) fluid and second tubes conveying the second (i.e. cooler) fluid. Thus it will be understood that, in these examples, the system has at least one mode of operation wherein there are more of the second thermally conductive tubes conveying the second (i.e. cooler) fluid than there are first thermally conductive tube(s) conveying the first (i.e. hotter) fluid. Of course the system may operate in other modes of operation other times.

In addition, or alternatively, in examples where the flow controller is arranged to convey a first fluid through the heat exchanger that is hotter than the second fluid, the Applicant has recognised that the heat transfer efficiency of the counterflow system can be improved by arranging for the second thermally conductive tube(s) conveying the second (i.e. cooler) fluid to have a larger surface area to volume ratio than the first thermally conductive tube(s) conveying the first (i.e. hotter) fluid. In such examples, one or more of the second thermally conductive tube(s) conveying the second (i.e. cooler) fluid may have a smaller diameter than the first thermally conductive tube(s) conveying the first (i.e. hotter) fluid. In a system having a common pressure for the first and second fluids, this also means that the second (i.e. cooler) fluid may flow faster and this also promotes heat transfer away from the first (i.e. hotter) fluid.

The Applicant has realised that the tubes conventionally used to convey fluids in a heat exchanger tend to have a round cross-section and this limits the contact surface area for heat transfer, even when the tubes are in contact with one another in an entwined tubular arrangement. It is desirable to increase the contact surface area.

In at least some examples, the heat exchanger comprises a thermally conductive filler material between the first and second tubes where they are in contact with one another. To maximise heat transfer efficiency, the filler material may be substantially the same thermally conductive material as the first and/or second tubes. In at least some examples the first and second tubes are made of the same thermally conductive material. The amount of thermally conductive filler material may be chosen to achieve a desired level of heat transfer efficiency.

In at least some examples, the thermally conductive filler material forms a brazed joint between the first and second materials. The brazed joint may be a fillet-brazed joint. The shape and/or size of the fillets may be chosen to achieve a desired level of heat transfer efficiency.

In addition, or alternatively, in at least some examples one or more of the first thermally conductive tubes and/or one or more of the second thermally conductive tubes may comprise a flattened surface area where the first and second tubes are in contact with one another. This helps to increase the contact surface area for heat transfer.

In addition, or alternatively, in examples where the flow controller is arranged to convey a first fluid through the heat exchanger that is hotter than the second fluid, one or more of the second thermally conductive tubes conveying the second (i.e. cooler) fluid may comprise a non-circular cross-section. These tubes may have a cross-section comprising a circular portion and a flattened portion, and/or a circular portion and a concave portion. In at least some examples, one or more of the first thermally conductive tubes and/or one or more of the second thermally conductive tubes may comprise a concave surface area where the first and second tubes are in contact with one another. Such tube profiles can help to maximise the contact surface area for transferring heat from the first fluid to the second fluid.

In a counterflow heat transfer system as disclosed above, the heat exchanger may be manufactured by any suitable process that can provide the entwined tubular arrangement of first and second tubes. Conventional manufacturing techniques commonly used to make tubular heat exchangers, e.g. metal extrusion or casting processes, may not be appropriate. In some examples, the entwined tubular arrangement may be made by investment casting. In some other examples, the entwined tubular arrangement may be made by additive manufacturing. In particular, an additive manufacturing (AM) technique may be used to build up a thermally conductive material layer-by-layer from a Computer-Aided Design (CAD) model. Especially when using additive manufacturing to make metal parts, such techniques often require the use of sacrificial support structures to hold the parts during the manufacturing process. The support structures are built, layer by layer, simultaneously with the object and then removed after the object is fully constructed. However, the Applicant has recognised that the support structure which is typically removed at the end of an additive manufacturing process can provide a heat exchanger with certain benefits if left in situ. Thus, in at least some examples the entwined tubular arrangement is at least partially supported by a support structure, preferably made of the same thermally conductive material as the first and second tubes. This structure is useful not only to aid in heat dissipation during the manufacturing process but also to help transfer heat out of those tubes conveying a hotter fluid during subsequent use of the heat exchanger.

According to another aspect of the present disclosure there is provided an entwined tubular arrangement for a heat exchanger, the arrangement comprising: at least one first thermally conductive tube for conveying a first fluid; at least one second thermally conductive tube for conveying a second fluid; wherein the first and second tubes are wound around one another and in contact with one another in an entwined tubular arrangement; and wherein the entwined tubular arrangement is supported by a support structure, preferably made of the same thermally conductive material as the first and second tubes.

An entwined tubular arrangement as disclosed herein may be used in a counterflow heat exchanger or a cross-flow heat exchanger, for instance the shell-and-tube type of heat exchanger. Examples of such an entwined tubular arrangement may independently include any of the features, taken alone or in any combination, already disclosed above in relation to a counterflow heat transfer system. Such features may relate to, for example, the number/diameter/cross-section/surface area of the first and/or second thermally conductive tubes in the arrangement, and any thermally conductive filler material between the first and second tubes where they are in contact with one another.

It will be appreciated that the support structure can aid in heat dissipation and structural support during manufacture of the entwined tubular arrangement, and also provide an additional means of heat dissipation when the entwined tubular arrangement is used in a heat exchanger. The support structure may also provide the entwined tubular arrangement with a mechanical support to mitigate against unwanted movement or vibration during use.

In additive manufacturing processes it is known to use thin, scaffold-like structures, or structures with small pointed teeth, to minimise the amount of part contact so that the support structures can be broken away from the manufactured part easily using hand tools. The Applicant has realised that a lattice-type support structure can also provide benefits when retained in an entwined tubular arrangement for a heat exchanger. The support structure may therefore comprise a lattice support structure, ideally a lattice support structure with very low volume fraction.

In some examples, a third fluid may be conveyed through the lattice support structure to assist in heat transfer. Thus, in examples of a counterflow heat transfer system as disclosed above, the flow controller may be arranged to convey a third fluid through the lattice support structure. The third fluid may be liquid or gas. In at least some examples, the flow controller may be arranged to convey first and second counterflow liquids through the entwined tubular arrangement and a cooling air flow through the lattice support structure.

In some other examples, in addition or alternatively, the lattice support structure may be at least partially filled with a thermally insulative material. This can result in minimal heat energy loss to the surrounding support structure and avoid radiative losses from the entwined tubular arrangement. For example, the lattice support structure may be filled with a lightweight polymer resin in a post-manufacturing process, the thermally insulative polymer resin acting to force heat transfer in the desired direction (i.e. from hotter to cooler fluid) in the entwined tubular arrangement.

For the support structure to be made of the same thermally conductive material as the first and second tubes, investment casting or additive manufacturing may be used. However, additive manufacturing techniques may be particularly well-suited for making entwined tube bundles that could not be made with conventional manufacturing methods. Thus, in various examples, the entwined tubular arrangement is formed by an additive manufacturing technique used to build up the thermally conductive material layer-by-layer from a Computer-Aided Design (CAD) model.

According to a further aspect of the present disclosure there is provided an additive manufacturing method of making an entwined tubular arrangement for a heat exchanger, comprising: using an additive manufacturing technique to build up one or more thermally conductive materials layer-by-layer from a Computer-Aided Design (CAD) model; building a support structure and an entwined tubular arrangement out of the thermally conductive material(s), wherein the entwined tubular arrangement comprises first and second tubes wound around one another and in contact with one another; and retaining at least some of the support structure after the entwined tubular arrangement has been built.

It will be understood that at least some of the support structure, possibly all of the support structure, is retained after building the entwined tubular arrangement. This is unusual, as in additive manufacturing techniques the support structure that is built to hold the parts during manufacture is usually sacrificed at the end of the manufacturing process. Preferably the support structure and the entwined tubular arrangement are built out of the same thermally conductive material.

The thermally conductive material(s) may be one or more of: ceramic, metal matrix composite, alloy or metal. Any suitable additive manufacturing (AM) or additive layer manufacturing (ALM) technique may be used. Some exemplary techniques include powder bed fusion (PBF), Selective Laser Melting (SLM), Selective Laser Melting (SLM), Direct Metal Laser Sintering (DMLS), Selective Laser Sintering (SLS), and electron beam melting (EBM) processes. Powder Bed Laser Fusion (PBF) or Electron Beam Melting (EBM) may be particularly suitable.

In examples according to any of the aspects of the disclosure above, one or more of the first and/or second thermally conductive tubes may comprise fins on an inside or outside surface. Such fins may further assist in achieving high heat transfer efficiency.

In examples according to any of the aspects of the disclosure above, the entwined tubular arrangement may take any suitable form. The first and second tubes may be wound around one another in a helical or non-helical arrangement. In some examples the first and second tubes are helically wound around a common axis in contact with one another in the entwined tubular arrangement.

In examples according to any of the aspects of the disclosure above, the thermally conductive material of the first and/or second tubes may be a metal (e.g. steel), alloy (e.g. Inconel or Haynes 282), metal matrix composite or ceramic. The thermally conductive filler material, where provided, may be the same or different thermally conductive material of chosen from a metal, alloy, metal matrix composite or ceramic. The thermally conductive material(s) may be chosen for compatibility with higher temperature and/or pressure aerospace applications.

BRIEF DESCRIPTION OF THE DRAWINGS

One or more non-limiting examples will now be described, by way of example only, and with reference to the accompanying figures, in which.

DETAILED DESCRIPTION

Figure 1:
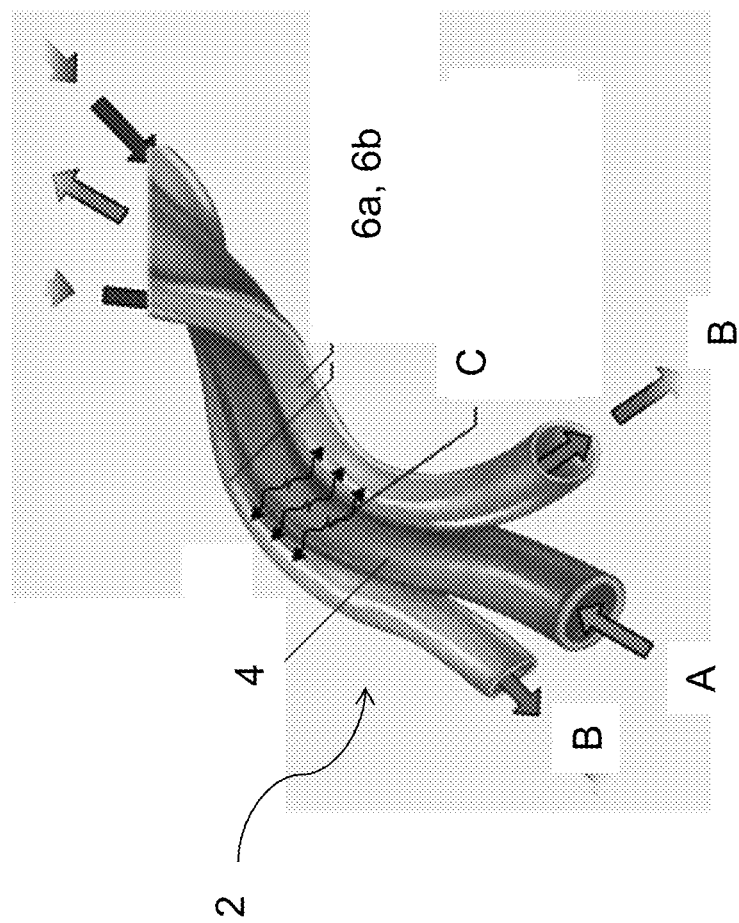
FIG. 1 is a schematic overview of an entwined tubular arrangement.

There is seen in FIG. 1 an overview of an entwined tubular arrangement 2 comprising a first thermally conductive e.g. metallic tube 4 conveying a hot fluid in the flow direction of the arrow A. The primary tube 4 is helically wound around a common axis in contact with two thermally conductive e.g. metallic secondary tubes 6a, 6b conveying a cooling fluid in the counterflow direction of the arrow B. The double-headed arrows C indicate heat transfer from hot to cold. The counterflow of fluids being conveyed through the first and second tubes 4, 6a, 6b in a heat exchanger is controlled by a flow controller (not shown) to form a counterflow heat transfer system.

Figure 2:
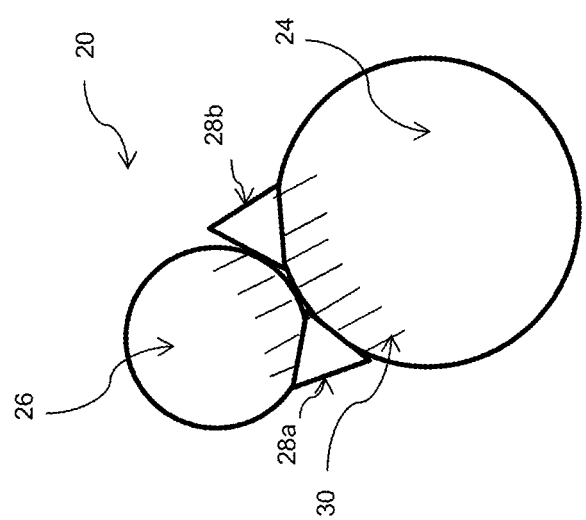
FIG. 2 is a schematic cross-sectional view of two tubes in an exemplary entwined tubular arrangement.
Figure 4B:
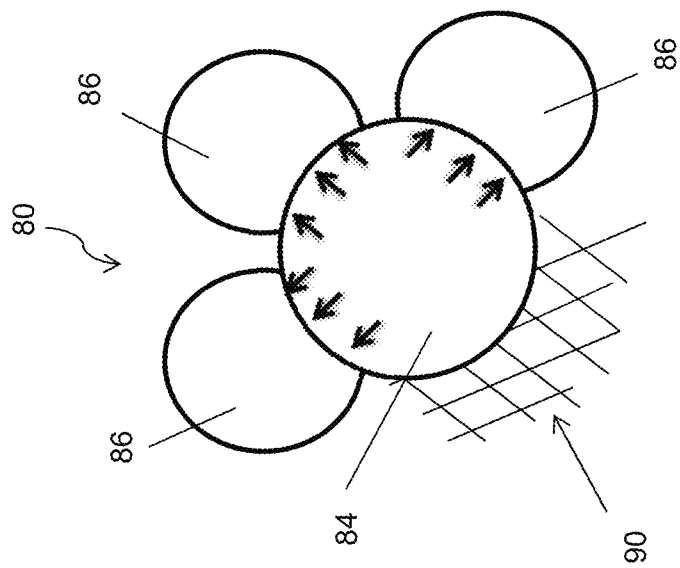
FIGS. 4a and 4b are schematic cross-sectional views of multiple secondary tubes in an entwined arrangement with a primary tube.
Figure 4A:
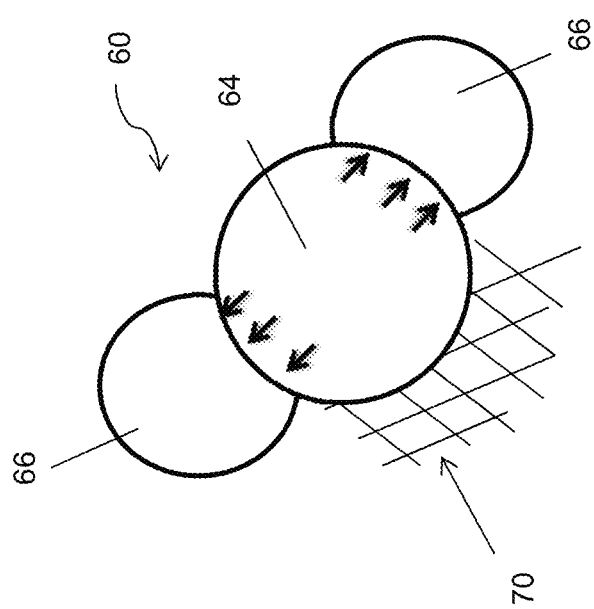

FIG. 2 illustrates a first example of an entwined tubular arrangement 20, using fillets to maximise heat transfer surface area. In this arrangement 20, a first thermally conductive e.g. metallic tube 24 and a second thermally conductive e.g. metallic tube 26 are helically wound around a common axis in contact with one another. One or more additional second tubes 26 may also be included, for example as generally seen in FIGS. 4a and 4b. In a heat exchanger, the first tube 24 may be used to convey a hot fluid that requires cooling and the second tube(s) 26 may be used to convey a cooling fluid in a counterflow direction. The second tube 26 has a smaller diameter than the first tube 24. Fillets 28a, 28b are placed in the area where the tubes 24, 26 are in contact with one another, to increase the heat transfer surface area. Both the first and second tubes 24, 26 optionally include fins 30 extending inwardly from the area where the tubes are in contact with one another, to provide a secondary heat transfer surface. Such an entwined tubular arrangement 20 may be made by additive layer manufacturing techniques.

Figure 3:
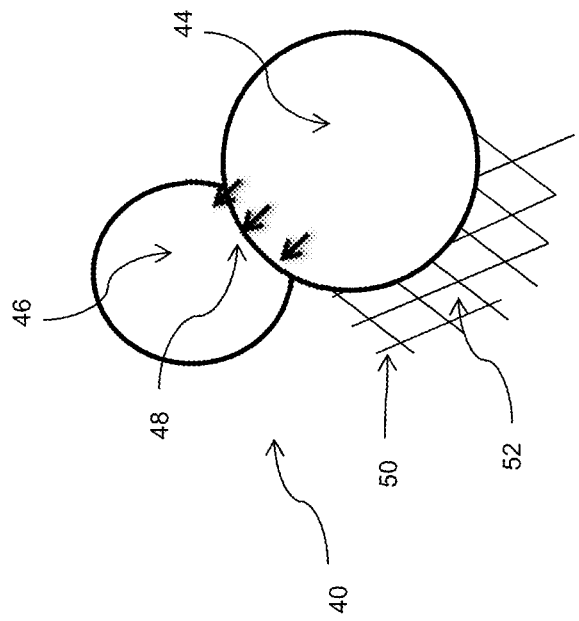
FIG. 3 is a schematic cross-sectional view of two tubes in another exemplary entwined tubular arrangement.

FIG. 3 illustrates a second example of an entwined tubular arrangement 40 comprising a first thermally conductive e.g. metallic tube 44 and a second thermally conductive e.g. metallic tube 46 helically wound around a common axis in contact with one another. One or more additional second tubes 46 may also be included, for example as generally seen in FIGS. 4a and 4b. In a heat exchanger, the first tube 44 may be used to convey a hot fluid that requires cooling and the second tube(s) 46 may be used to convey a cooling fluid in a counterflow direction. The second tube 46 has a smaller diameter than the first tube 44. The second tube 46 has a concave surface area 48 in contact with the round first tube 44. The entwined tubular arrangement 40 comprises a lattice support structure 50, preferably made of the same thermally conductive material as the first and second tubes 44, 46. The lattice support structure 50 was built when an additive manufacturing technique was used to build up the thermally conductive material layer-by-layer from a Computer-Aided Design (CAD) model, and subsequently retained post-manufacture. The lattice support structure 50 is optionally filled with a thermally insulative (e.g. polymer or resin) material 52 that can act as an insulating barrier, forcing the heat transfer in the direction desired from the first tube 44 to the second tube(s) 46.

FIGS. 4a and 4b illustrate some further examples of entwined tubular arrangements 60, 80 that may be used in conjunction with any of the previously described examples.

In FIG. 4a, the entwined tubular arrangement 60 comprises a first thermally conductive e.g. metallic tube 64 and two secondary thermally conductive e.g. metallic tubes 66 that are all helically wound around a common axis in contact with one another. The entwined tubular arrangement 60 comprises a lattice support structure 70, preferably made of the same thermally conductive material as the tubes 64, 66. The lattice support structure 70 is optionally filled with a thermally insulative (e.g. polymer or resin) material. In a heat exchanger, the primary tube 64 may be used to convey a hot fluid that requires cooling and the secondary tubes 66 may be used to convey a cooling fluid in a counterflow direction. The secondary tubes 66 have a smaller diameter than the primary tube 64. The small arrows depict how heat may be transferred from the primary tube 64 to the secondary tubes 66 through surface contact.

In FIG. 4b, the entwined tubular arrangement 80 comprises a first thermally conductive e.g. metallic tube 84 and three secondary thermally conductive e.g. metallic tubes 86 that are all helically wound around a common axis in contact with one another. The entwined tubular arrangement 80 comprises a lattice support structure 90, preferably made of the same thermally conductive material as the tubes 84, 86. The lattice support structure 90 is optionally filled with a thermally insulative (e.g. polymer or resin) material. In a heat exchanger, the primary tube 84 may be used to convey a hot fluid that requires cooling and the secondary tubes 86 may be used to convey a cooling fluid in a counterflow direction. The secondary tubes 86 have a smaller diameter than the primary tube 84. The small arrows depict how heat may be transferred from the primary tube 84 to the secondary tubes 86 through surface contact.

Although not shown in FIGS. 4a and 4b, optionally there may be fillets placed in the area where the secondary tubes 66, 86 are in contact with the primary tube 64, 84 to increase the heat transfer surface area. In addition, or alternatively, any of the tubes 64, 66, 84, 86 may optionally include fins extending inwardly from the area where the tubes are in contact with one another, to provide a secondary heat transfer surface.

While currently available additive layer manufacturing techniques typically use the same material throughout the layer building process, it is envisaged that a different thermally conductive (e.g. metallic) material may be used for the lattice support structure 50, 70, 90. This may be exploited, for example, to optimise the heat transfer properties of the lattice support structure as compared to the tubes.

The invention claimed is:

1. An additive manufacturing method of making an entwined tubular arrangement for a heat exchanger, comprising:
    using an additive manufacturing technique to build up one or more thermally conductive materials layer-by-layer from a Computer-Aided Design (CAD) model;
    building a support structure and the entwined tubular arrangement out of the one or more thermally conductive materials, wherein the entwined tubular arrangement comprises first and second tubes wound around one another and in contact with one another; and
    retaining the support structure after the entwined tubular arrangement has been built;
    wherein the support structure comprises a lattice support structure, the lattice support structure at least partially filled with a thermally insulative material.

2. The method of claim 1, wherein the support structure and the entwined tubular arrangement are made of a same thermally conductive material.

3. The method of claim 1, wherein building the entwined tubular arrangement comprises placing a thermally conductive filler material between the first and second tubes where they are in contact with each other.

4. The method of claim 1, wherein the thermally conductive filler material is made of the same thermally conductive material as the first and/or second tubes.

5. The method of claim 1, wherein building the entwined tubular arrangement comprises forming fins on an inside or outside surface of the first and/or second tubes.

6. The method of claim 1, wherein the first and second tubes are helically wound around a common axis in contact with one another in the entwined tubular arrangement.

7. The method of claim 1, wherein the first and second tubes have different diameters.

8. The method of claim 1, wherein one or more of the first and second tubes comprises a non-circular cross-section.

9. The method of claim 1, wherein one or more of the first and second tubes comprises a flattened or concave surface area where the first and second tubes are in contact with one another.

10. The method of claim 1, wherein the additive manufacturing technique is one of: powder bed fusion (PBF), Selective Laser Melting (SLM), Selective Laser Melting (SLM), Direct Metal Laser Sintering (DMLS), Selective Laser Sintering (SLS), and electron beam melting (EBM) processes.

* * * * *